W. B. FEATHERSTONE.
MOTION PICTURE MACHINE.
APPLICATION FILED JAN. 23, 1907. RENEWED AUG. 25, 1911.
1,034,006.
Patented July 30, 1912.
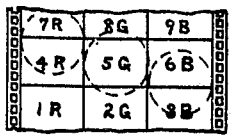
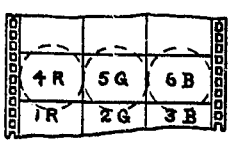
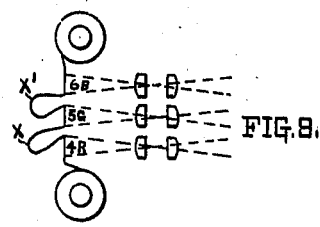
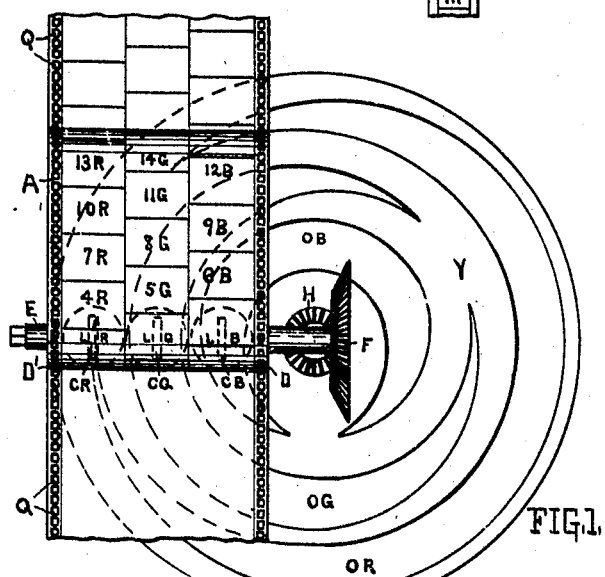
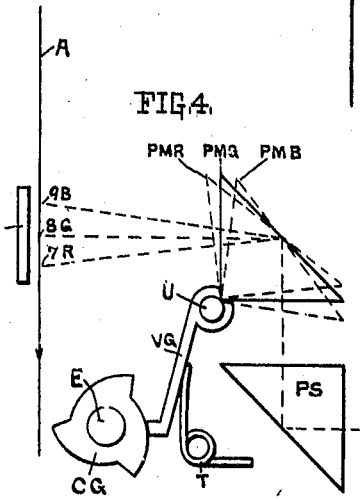
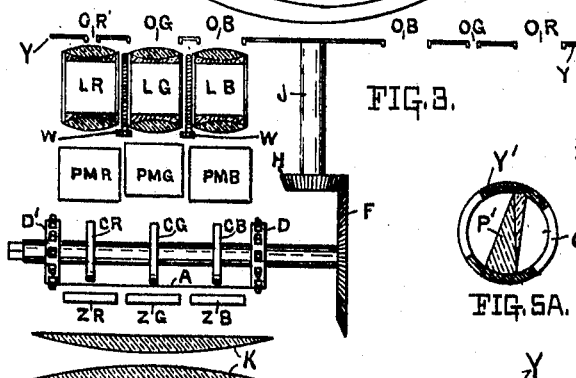
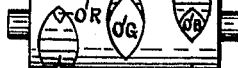
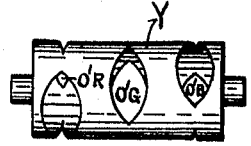
Witnesses:
E. M. Brown
W. L. Hewitt
Inventor
Willard B. Featherstone.
By his Attorney
Edward N. Pagelsen.

UNITED STATES PATENT OFFICE.

WILLARD B. FEATHERSTONE, OF WASHINGTON, DISTRICT OF COLUMBIA, ASSIGNOR TO HARRY S. WARREN, OF DETROIT, MICHIGAN.

MOTION-PICTURE MACHINE.

1,034,006.  Specification of Letters Patent.  Patented July 30, 1912.

Application filed January 23, 1907, Serial No. 353,635. Renewed August 25, 1911. Serial No. 646,034.

*To all whom it may concern:*

Be it known that I, WILLARD B. FEATHERSTONE, a citizen of the United States, residing at Washington, in the District of Columbia, have invented a new and useful Motion-Picture Machine, of which the following is a specification.

My invention relates to the recording and reproduction of objects or scenes through rapidly successive photographic images, and has for its object the projection of a picture which shall show not only the motions of the original, but the colors as well, and without the undesirable flicker produced by the usual type of machine. I accomplish this by making several (ordinarily three) series of negatives, each through a differently colored filter; then, after making positives in the usual way, I project each series through a filter corresponding in color with the one which modified its negative.

By a suitable design and arrangement of shutter and mechanism I cause the colors as projected to blend, forming hues normal to the original, there being no perceptible flicker or unsteadiness of the reproduction.

In the drawings, Figure 1 shows a portion of the machine and film looking toward the screen. Fig. 2 is a side view showing the optical arrangement and the direction of the projected rays. Fig. 3 is a top view, partly in section. Fig. 4 is a full size side view, showing reflecting prisms and a cam-wheel for tilting one of them. Fig. 5 shows an alternate type of shutter as viewed from the rear. Fig. 5ᴬ shows section of same with a chromatic prism inside. Fig. 6 shows an alternative style of film and arrangement of objectives. Fig. 7 shows the latter film and three objectives arranged for use with intermittent-feed mechanism. Fig. 8 shows a three-series film in one strip and a suggested arrangement of objectives for intermittent feed. Fig. 9, a similar film for alternating feed also the arrangement of film reels and lenses.

In Figs. 1, 2 and 3, A is the film, which has three rows of positives, 4–R, 7–R, 10–R. etc.; 5–G, 8–G, 11–G, etc.; and 6–B, 9–B, 12–B, etc.; which I shall designate as series R, series G and series B. Series R has been printed from a series of negatives taken through a red filter; series G, through a green filter; and series B, through a blue filter. Now if an image from each series, taken at the same time were projected simultaneously and coincidently upon the screen, each through a filter of its corresponding color, the resultant blended colors would correspond with those of the original. A machine designed to accomplish this alone would require an intermittent-feed mechanism, which is the chief cause of the flicker of the usual present day machines. I, therefore, employ a shutter, Y, Fig. 1, which exposes and darkens each series in turn, but gradually, the effect being similar to that of a " dissolving " stereopticon, the darkening of one image being effected while those of the other two series are at maximum light. The shutter openings O–R, O–G and O–B revolve before the objective lenses L–R, L–G and L–B, respectively. The light from the lantern traverses the condensing lenses, K, Fig. 2, the film A, the movable reflecting prisms PM–R, PM–G and PM–B, Figs. 2 and 4, then the stationary reflecting prism, PS, and finally the objectives L–R, L–G and L–B, Fig. 3, and the shutter openings O–R, O–G and O–B, (Figs. 1 and 3). The continuous motion of the film downward past the field is produced by the revolution of sprocket wheels D, D', on shaft E, which shaft also carries the bevel-gear, F, and the cam-wheels C–R, C–G and C–B, which operate to vary the angular positions of reflecting prisms PM–G, etc., by moving the levers V–G, etc., about the fulcrum, U, Fig. 4. The smaller bevel gear, H, on shaft, J, Figs. 1 and 3, revolves at three times the speed of F, hence the shutter, Y, which is fixed to shaft, J, makes three revolutions while the sprocket-wheels, D, D', make one. There are twelve sprockets on each wheel and four holes, Q, Q, to each image of the film, hence the shutter makes one revolution while the film moves the vertical length of one image.

The operation of the machine is as follows: The light from the condenser, K, Fig. 2, traverses the images, 7–R, 8–G and 9–B. The light through 7–R is reflected by the prism PM–R which has been gradually tilted from the angle of PM–B to its present angle by the action of cam C–R, Figs. 3 and 4, and is now about ready to be returned to the starting angle (same as PM–B) by the spring, T. The angular motion of the reflecting surface counteracts the motion of the film and makes the image appear stationary on the screen after further reflection through PS and projection through the objective L-R and the opening O-R in shutter, Y, Figs. 1 and 3. This opening has been diminishing in effective aperture and is about to close entirely for a brief interval, during which the prism PM-R will quickly return to position PM-B, Fig. 4, and will then begin to reflect the image 10-R, Fig. 1, as the shutter opening, O-R, gradually enlarges to reach a maximum, when the image becomes central and the prism reaches the position PM-G, Fig. 4. Each prism, in turn, tilts steadily from position PM-B through position PM-G to PM-R, Fig. 4, and then, while the light is shut off, jumps back to position PM-B and begins to reflect the next image of the series. Thus, while 7-R is at lowest position, as shown in Figs. 1 and 4, 8-G is half-way down and higher than 7-R by a distance equal to one-third of the height of an image. 9-B is at top position and just beginning to show.

All three images are projected on the screen, but 8-G is momentarily brighter than either 7-R or 9-B, therefore the blended picture has a greenish cast. In one-third of a revolution of the shutter, 8-G will be dimmed by the reduction of shutter opening, O-G; 10-R will have taken the place of 7-R, and 9-B will have full brilliancy, hence the blended picture will have a bluish cast. In another third of a revolution 9-B will be dimmed, 11-G will take the place of 8-G, and 10-R will be brighter, giving the picture a reddish cast, all of which occurs several times each second, or so quickly that the eye cannot detect the variations but will only receive an impression of the true colors of the original.

The screw adjustment, W, Fig. 3, is for the purpose of changing the positions of objectives, L-R, L-G and L-B to register the three compotent images when exhibiting at different distances from the screen.

Instead of the disk shutter, Y, Fig. 1, I could employ another style, Y', Fig. 5, giving two exposures to each series during each revolution, but I have described the disk type as its operation is more easily understood.

Several alternative methods might be employed to produce effects similar to those herein described, as by having all three images (one of each series) side by side, as in Fig. 6, and stepping the mirrors and objectives instead of the images.

The usual type of machine might be enlarged and given three lenses to accommodate such a film, Fig. 7, and suitable filters, but this would still involve shutting off all of the light at once and would not eliminate the flicker, although the machine could, of course, be run more slowly and preserve the true colors.

Another modification for intermittent feed would use a narrow film with the images of the several series all in one row, Fig. 8, and have the objectives disposed vertically and some distance apart. In a single-strip machine designed for dissolving effects there would be loops of film X, X', between stops, as shown in Fig. 9. The slack film of each loop is taken up alternately by the intermittent feeding mechanism, which pulls the film past the lenses one at a time so that two images are always stationary before their respective lenses. With such a film either reflecting prisms or intermittent-feed mechanism could be used, but the disadvantage of a long and narrow film would still obtain, and the successive images of the same series are too far apart to be practicable.

Still another alternative is to employ varying refraction instead of reflection to keep the images registered, as an achromatic prism, P', within shutter, Y', Fig. 5A.

My new machine offers the following additional advantages: Shorter film, wider (hence steadier) film, slower motion of parts, continuous motion of film, very simple mechanism, both for recording and projection, little wear and tear of film and, of course, ideal effects. Quite a variety of unusual and special effects may be produced with such a machine and specially prepared films, for instance, by making several series of negatives which have some relation to each other and may yet have been taken independently, the result being similar to that sometimes produced with a "dissolving" stereopticon. Overlaid effects and special colorings may be introduced,—in fact, the possibilities in this direction are almost unlimited. The use of color filters in projection, or even in the taking of the original negatives, is not the only way to reproduce the hues of the original, as the film itself may be dyed, (say in three different colors,— as red, green and blue) and, in the case of the positive film, the positives are made by contact in the usual way, from negatives produced in the way heretofore described, and then the films may be run through set of three printing-rollers, each of which will dye a series, which, when projected will give about the same tint as the black and white positives would have given with a filter of the corresponding color. In practice this will probably be done a great deal, as it is often considered desirable to produce effects which overcolor or exaggerate the original.

I claim:

1. In a motion-picture machine adapted to project a plurality of series of images simultaneously, a shutter having apertures to expose an image of each series in turn, and having the apertures overlapping to begin the exposure of an image of one series before the preceding image has been occulted.

2. In a motion-picture machine adapted to project simultaneously three series of images, continuous-feed mechanism for the several series, periodically movable optical means for each series to counteract the motion of the successive images, and a different color filter for each series.

3. In a motion-picture machine, the combination of a frame, a plurality of stationary lenses carried thereby, a filter for each lens, each filter being of a different color, and a shutter having an opening of varying width for each lens, the openings overlapping each other.

4. In a motion-picture machine, the combination of a frame, three stationary lenses carried thereby, a filter of a different color for each lens, and a circular shutter having arc shaped openings with tapering ends, the ends of each opening overlapping the other two openings.

5. In a motion-picture machine, adapted to transmit a plurality of series of images the combination of a frame, a plurality of stationary optical devices to project the plural series of images along stationary lines, periodically movable optical means to counteract the motion of each series in turn, a color filter for each series, and a shutter having openings through which the images may be alternately exposed.

6. In a motion-picture machine adapted to project simultaneously plural series of images, continuous-feed mechanism for the several series, periodically movable optical means for each series to counteract the motion of the successive images, and a different color-filter for each series.

7. In a motion-picture machine, the combination of a frame, a plurality of stationary lenses carried thereby, and a shutter having an opening of varying width for each lens, the openings overlapping each other.

8. In a motion-picture machine, the combination of a frame, three stationary lenses carried thereby, a filter of a different color for each lens, and a circular shutter having arc-shaped openings, the ends of each opening overlapping the other two openings.

9. In an optical reproduction apparatus the combination with a plurality of lenses adapted to project plural series of images, continuous feed mechanism for the several series, and periodically movable optical means, to counteract the motion of each series in turn; of a color filter for each series, and a shutter having overlapping apertures to expose alternately and gradually the images of the several series.

10. In a motion-picture machine of the class described, three lenses mounted in the same, a different color filter for each lens and a shutter with three overlapping apertures so arranged as to admit light gradually through one lens before the other lenses have been occulted.

11. In a motion picture machine, optical means to project simultaneously three series of related images, a shutter having three overlapping apertures adapted to produce dissolving effects.

12. In a motion-picture machine, optical means to project three series of images simultaneously, a shutter having apertures to expose an image of each series in turn, the apertures overlapping to begin the exposure of an image of one series before the preceding image has been occulted.

13. In a motion-picture machine, optical means to project simultaneously three series of images, continuous feed-mechanism for the several series, and periodically movable optical means for each series to counteract the motion of the successive images.

WILLARD B. FEATHERSTONE.

Witnesses:
 JEX J. MARTIN,
 JOHN A. RUSSELL.